(12) United States Patent
Giorgio (10) Patent No.: US 8,726,620 B2
(45) Date of Patent: May 20, 2014

(54) SELF-ADJUSTING CENTRING DEVICE

(75) Inventor: Oppici Giorgio, Rubbiano-Solignano (IT)

(73) Assignee: A.C.M.L.—Societa' per Azioni, Fornovo di Taro (IT)

( * ) Notice: Subject to any disclaimer, the term of this patent is extended or adjusted under 35 U.S.C. 154(b) by 1048 days.

(21) Appl. No.: 12/298,779

(22) PCT Filed: Mar. 28, 2007

(86) PCT No.: PCT/EP2007/052977
§ 371 (c)(1),
(2), (4) Date: Nov. 5, 2008

(87) PCT Pub. No.: WO2007/124990
PCT Pub. Date: Nov. 8, 2007

(65) Prior Publication Data
US 2009/0235620 A1 Sep. 24, 2009

(30) Foreign Application Priority Data
Apr. 28, 2006 (IT) .............................. RE2006A0053

(51) Int. Cl.
*B65B 35/50* (2006.01)
*B65B 21/16* (2006.01)

(52) U.S. Cl.
USPC .......................................................... 53/543

(58) Field of Classification Search
USPC .......................................................... 53/543
See application file for complete search history.

(56) References Cited

U.S. PATENT DOCUMENTS

| 4,215,521 A | 8/1980 | Hartness |
| 5,653,088 A | 8/1997 | Cline |

FOREIGN PATENT DOCUMENTS

| DE | 297 08 319 | 9/1998 |
| GB | 2 181 711 | 4/1978 |

*Primary Examiner* — Thanh Truong
*Assistant Examiner* — John Paradiso
(74) *Attorney, Agent, or Firm* — Occhiuti & Rohlicek LLP (57) ABSTRACT

A device for centring objects, comprising a supporting frame (10) which supports an overall flat grid, the individual cells of which are each suitable for downwardly guiding an object to be centred, the device comprising a plurality of parallel rows of distinct centring members (400) which define nodes of the grid, each single row of the centring members (400) being supported by a single straight guide (202, 204, 224 ) of a series of coplanar, parallel straight guides (202, 204, 224), the straight guides (202, 204, 224) being mobile on the supporting frame (10), and being connected to one another by a second mechanism (211) which is configured such as to allow a reciprocal nearing and distancing of the straight guides (202, 204, 224) by second moving means (210, 210' 202', 204') provided for activating said second mechanism (211), the centring members (400) of each row being slidingly coupled to their relative straight guide (202, 204, 224) characterized in that each centring member (400) of each straight guide is directly connected to the adjacent ones by a single mechanism (311) configured in such a way as to allow the centring members 400) of each straight guide to near and distance reciprocally while remaining equidistant to one another, all the single mechanisms (311) being simultaneously activated by first means for moving (201, 203).

24 Claims, 9 Drawing Sheets

SELF-ADJUSTING CENTRING DEVICE

CROSS-REFERENCE TO RELATED APPLICATIONS

This application is being filed as a U.S. National Stage under 35 U.S.C. 371 of International Application No. PCT/EP2007/052977, filed on Mar. 28, 2007, which claims the benefit of Italian Application No. RE2006A000053, filed Apr. 28, 2006, the contents of which is hereby incorporated by reference in its entirety.

TECHNICAL FIELD

This invention concerns the bottling sector, and more specifically the operations of packaging and packing bottles in cardboard containers of known type.

BACKGROUND ART

Bottles can be conveyed not only in line on production lines on suitable conveyors, but also using pallets on which the erect bottles are arranged next to one another in various rows comprising an equal number of bottles.

Before transfer onto the pallet, the bottles are ordered in various rows on a plane, in the same configuration in which they are to be arranged on the plane of the pallets Transfer from the ordering plane to the pallet plane is effected by robot machines controlled by a central processor, which machines have coplanar organs for gripping the bottles by the neck and transferring an already-ordered row of bottles to the pallet.

No description of the devices involved in the above-mentioned operations is provided herein, since such devices are well known to persons skilled in the art.

The final transfer of the bottles is into the packaging carton in which they are dispatched to a final destination for consumption.

This transfer is effected using devices of the type employed for the above-mentioned operations, in which) obviously, the coplanar organs for gripping comprise means for gripping in a same number and order as the bottles to be inserted into a elative carton.

This procedure may be subject to drawbacks when there is a cardboard divider insert inside the carton, defining individual cells into each of which a battle is to be inserted.

It can happen that the bottles tend to catch against the upper edge of the dividing insert, thus making the entire operation difficult to perform.

To obviate this problem, known means for centring exist, comprising a frame within which there is a grid having the same configuration as the divider insert, and being vertically mobile in relation to the insert, the cells of the grid being arranged to correspond to the cells of the under-lying insert.

Downwards-directed oscillating centring leads are arranged on the sides of each cell of the grid, which leads are elastically retained so as to converge towards a centre of each cell, so that when the grid is lowered onto the to underlying carton, the leads easily enter a corresponding cell of the insert below.

The leads are spread apart by the bottle being inserted from above into the carton, and guide the bottle into the corresponding cell, thus preventing it from catching on the upper edge of the insert.

Also known are centring devices of the above-described type wherein the leads are arranged at the points where the orthogonal sides of the grid intersect each other, rather than being arranged on the sides of the grid. Although they perform their function well, these known grids have the drawback of being operatively linked to a specific form of carton and bottle.

In other words, when a different type of carton is used, the grill of the centring device needs to be substituted or manually modified, causing serious wasting of time and increasing costs.

Disclosure of Invention

The aim of the invention is to overcome the above-mentioned drawbacks with a simple, reliable and economical construction.

The aim is achieved, according to the invention, by a centring device having the characteristics illustrated in the independent claim.

The dependent claims concern particular variants or embodiments of the invention described in the independent claim.

BRIEF DESCRIPTION OF THE DRAWINGS

The constructional and functional characteristics of the invention will emerge from the detailed description that follows, which concerns a preferred embodiment thereof illustrated in the figures of the appended figures of the drawings, provided as a non-limiting example.

BEST MODE FOR CARRYING OUT THE INVENTION

The figures illustrate a frame 10 made of sections of extruded aluminium of predetermined dimensions, which frame 10 comprises four consecutive sides, respectively 101, 102, 103 and 104.

Two cross members 201 and 203 are supported below the first frame, both parallel to the sides 101 and 103. The cross members 201 and 203 are slidable in a parallel direction to the sides 102 and 104.

The sliding motion is commanded to be done symmetrically to the central axis of the frame 10 by means of the following mechanism.

An electric step motor 105 is constrained to one end of the side 102 and rotates, by means of a orthogonal transfer gear mechanism, a shaft 110 parallel to the side 102, which shaft 110 comprises at ends thereof two portions 106 of endless screw.

Figure 5:
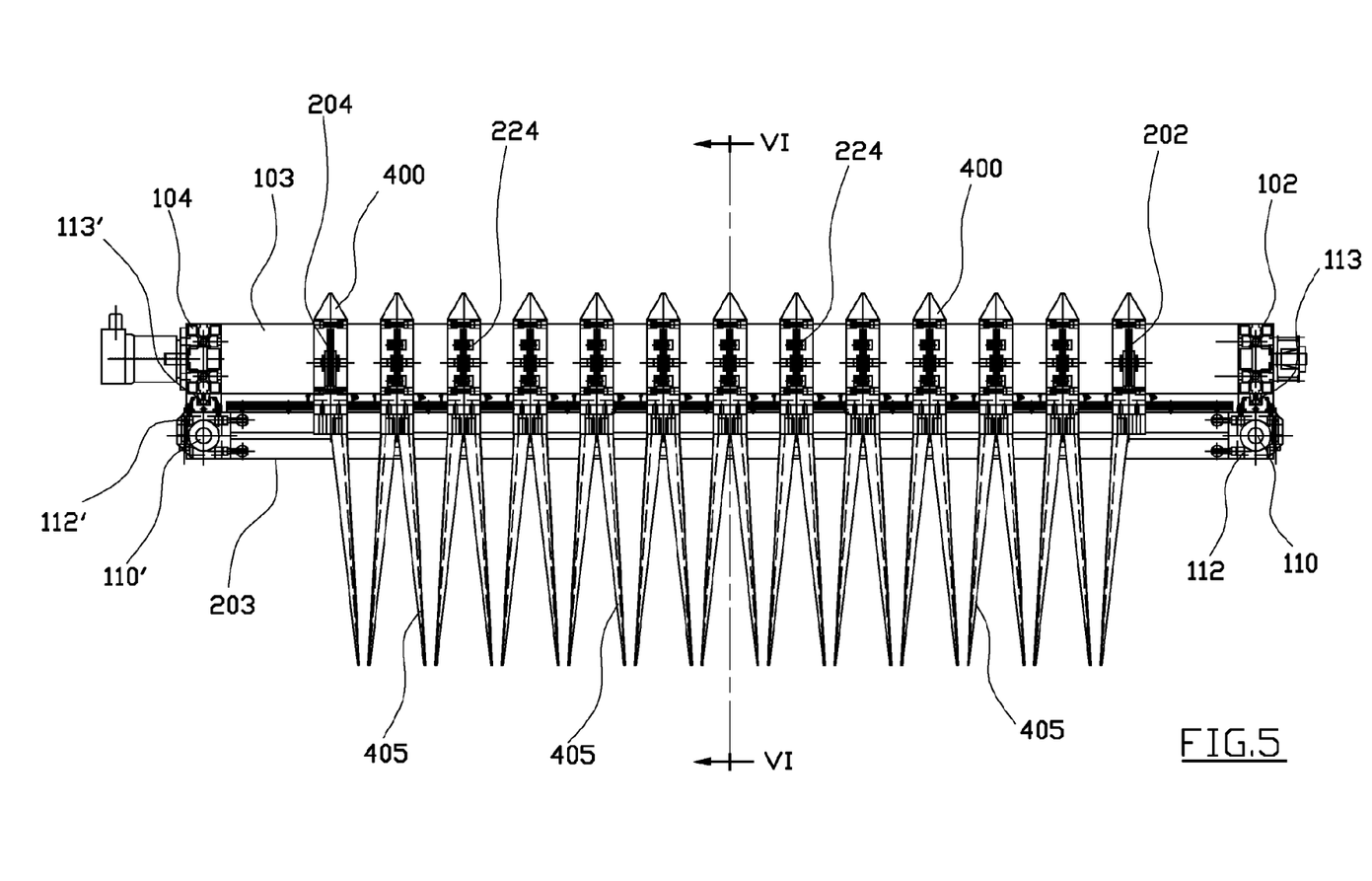
FIG. 5 shows the section V-V indicated in FIG. 1.

Two blocks 112, of which only one is visible in FIG. 5, are inserted into the portions 106, which blocks 112 are connected respectively to the ends of the cross members 201 and 203, and which blocks 112 slide suspended from two respective guides 113 fixed below the side 102.

One end of the shaft 110 has a cogged pulley 108 which is coupled to a cogged belt 109.

Figure 3:
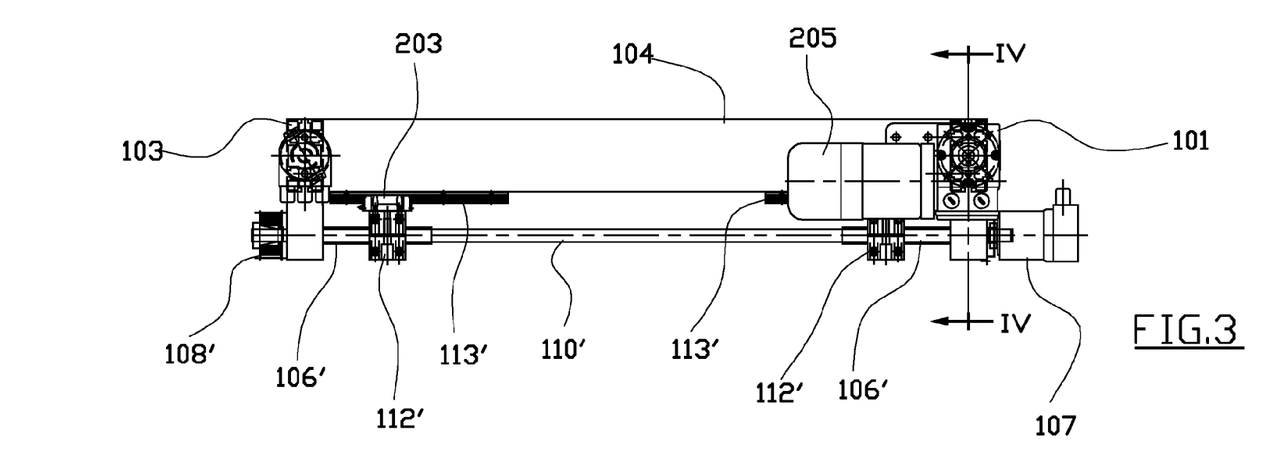
FIG. 3 is the view indicated by III in FIG. 1, where certain elements of the invention have been omitted for greater clarity.

As shown in FIG. 3, the side 104, parallel to side 102, supports the slidable opposite ends of the cross members 201 and 203, which are suspended from two guides 113' solidly constrained to the side 104, in the same way as the ends suspended from side 102 are supported.

In particular, the opposite ends are connected to respective blocks 112', which are slidingly coupled to a respective guide of the guides 113'.

The blocks 112' are inserted into the threaded portions 106' of a shaft 110', parallel to the side 104, which shaft 110' bears at one end thereof a cogged pulley 108' connected to the pulley 108 via the belt 109.

In this way, the cross members 201 and 203 are controlledly moved symmetrically towards one another. A branch of the belt 109 runs, in the centre, on three tensioner pulleys 111 having the function of keeping the belt stretched. Further, an encoder 107 is keyed to the end of the shaft 110' opposite the pulley 108'.

Figure 1:
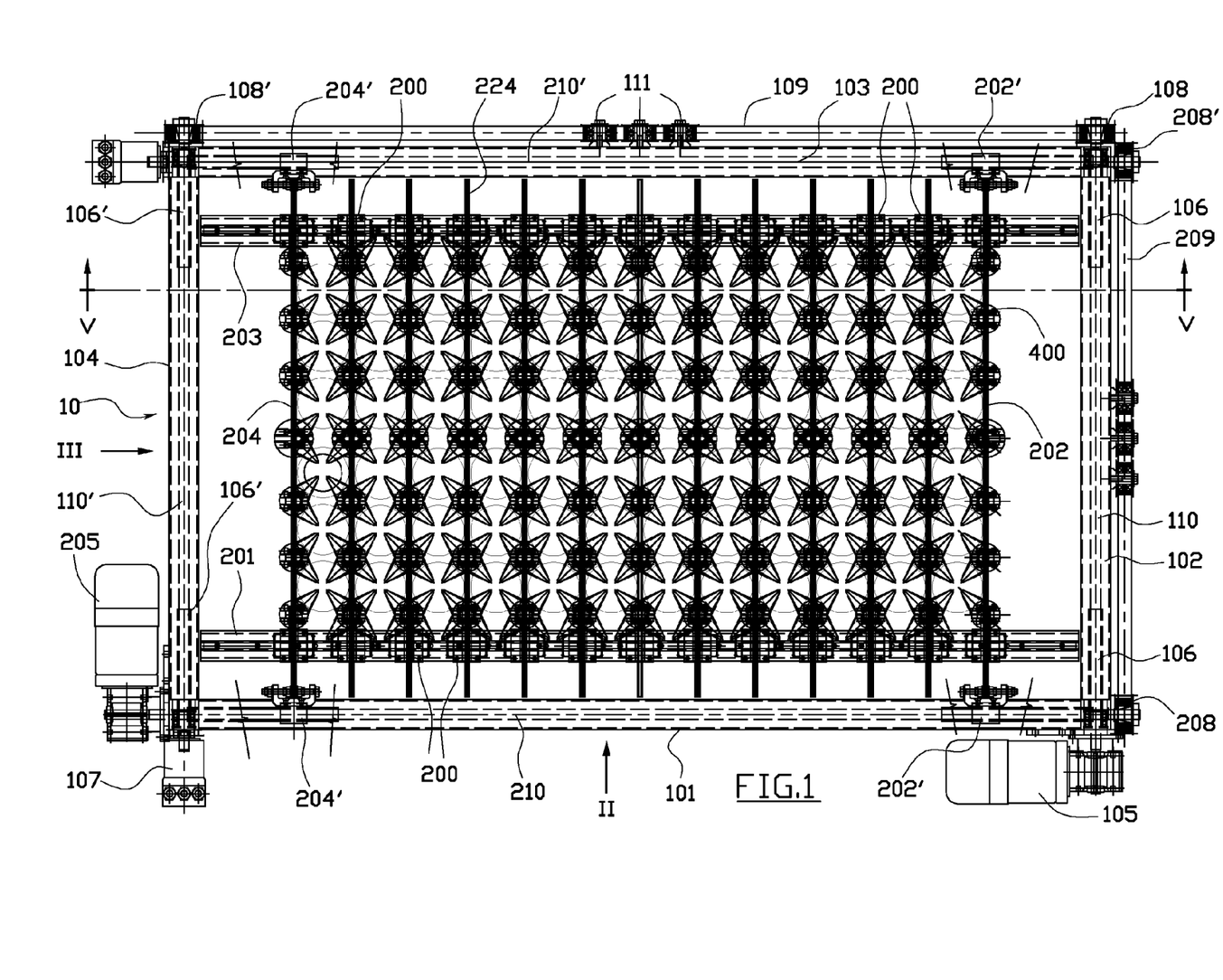
FIG. 1 shows the invention in plan view.

As shown in FIG. 1, thirteen blocks 200 slide on each of the two cross members 201 and 203.

The pair of blocks 200 located at one end of the cross members 201 and 203 supports a metal guide 204 parallel to the side 104 and extending as far as the sides 101 and 103 of the frame 10, where it is coupled to blocks 204' which are slidable on the sides 101 and 103. Similarly at the other end, a pair of blocks 200 supports a metal guide 202 parallel to the side 102 and extending as far as the sides 101 and 103, where it is coupled to blocks 202' which are slidable on the sides 101 and 103.

Figure 4:
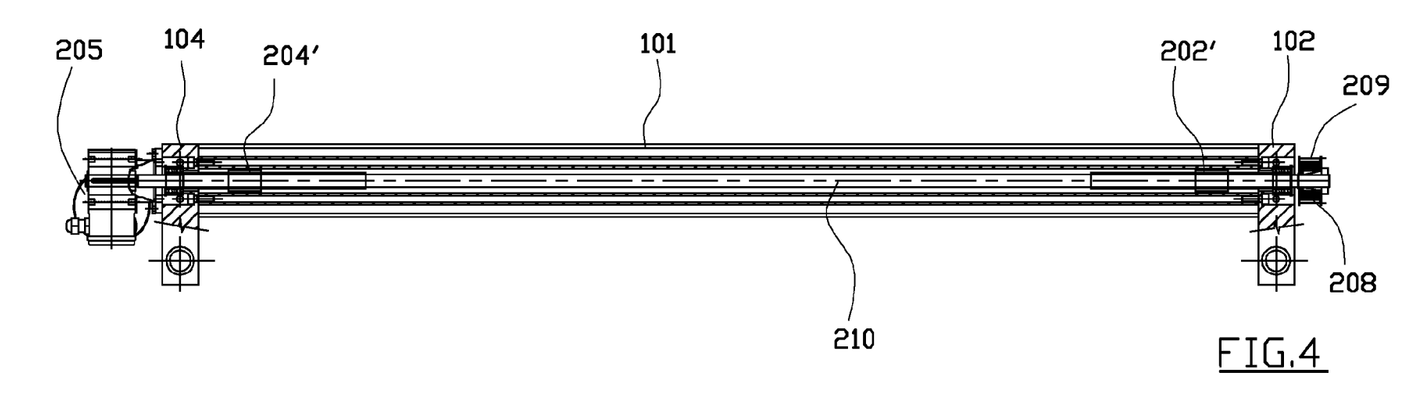
FIG. 4 shows the section IV-IV indicated in FIG. 3.

The blocks 202' and 204', slidable on the side 101, are inserted into the threaded end of a shaft 210, which is rotated by a step motor 205 (see also FIG. 4).

At one end thereof the shaft 210 bears a cogged pulley 208 which by means of a cogged belt 209 draws a pulley 208' keyed to a shaft 210' which shaft 210', like shaft 210, has two threaded portions coupled with the blocks 202' and 204', which blocks 202' and 204' are slidable on the side 103.

In this way the guides 202 and 204 are commanded to move symmetrically and in a controlled way in relation to the axis of the frame 10 parallel to the sides 102, 104.

The eleven pairs of blocks 200 located between the guides 202 and 204 and slidable on the cross members 201 and 203 each support a metal guide 224 having a section similar to that of the guides 202 and 204 and being parallel to the guides 202 and 204.

Figure 2:
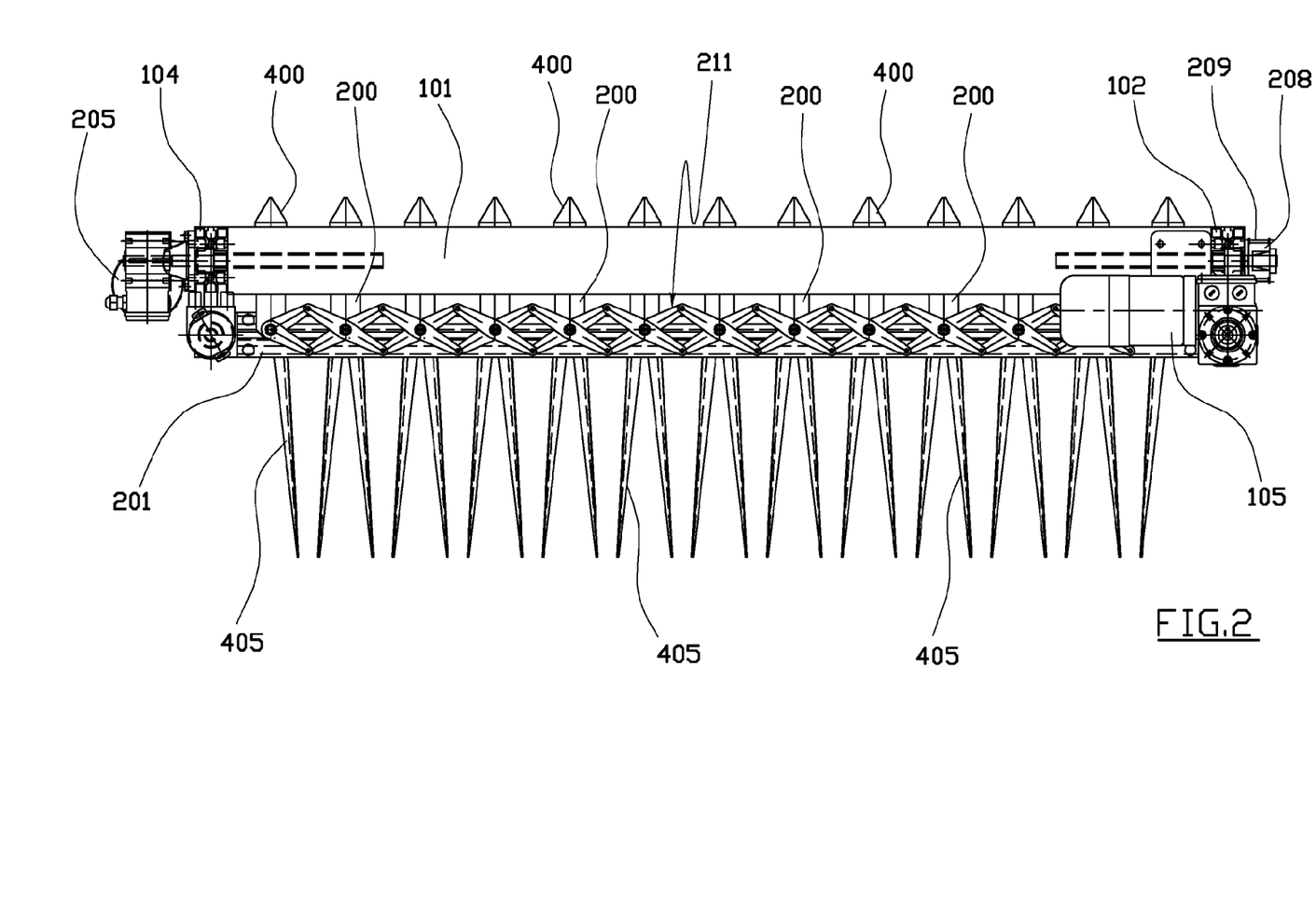
FIG. 2 is the view indicated by II in FIG. 1.
Figure 6:
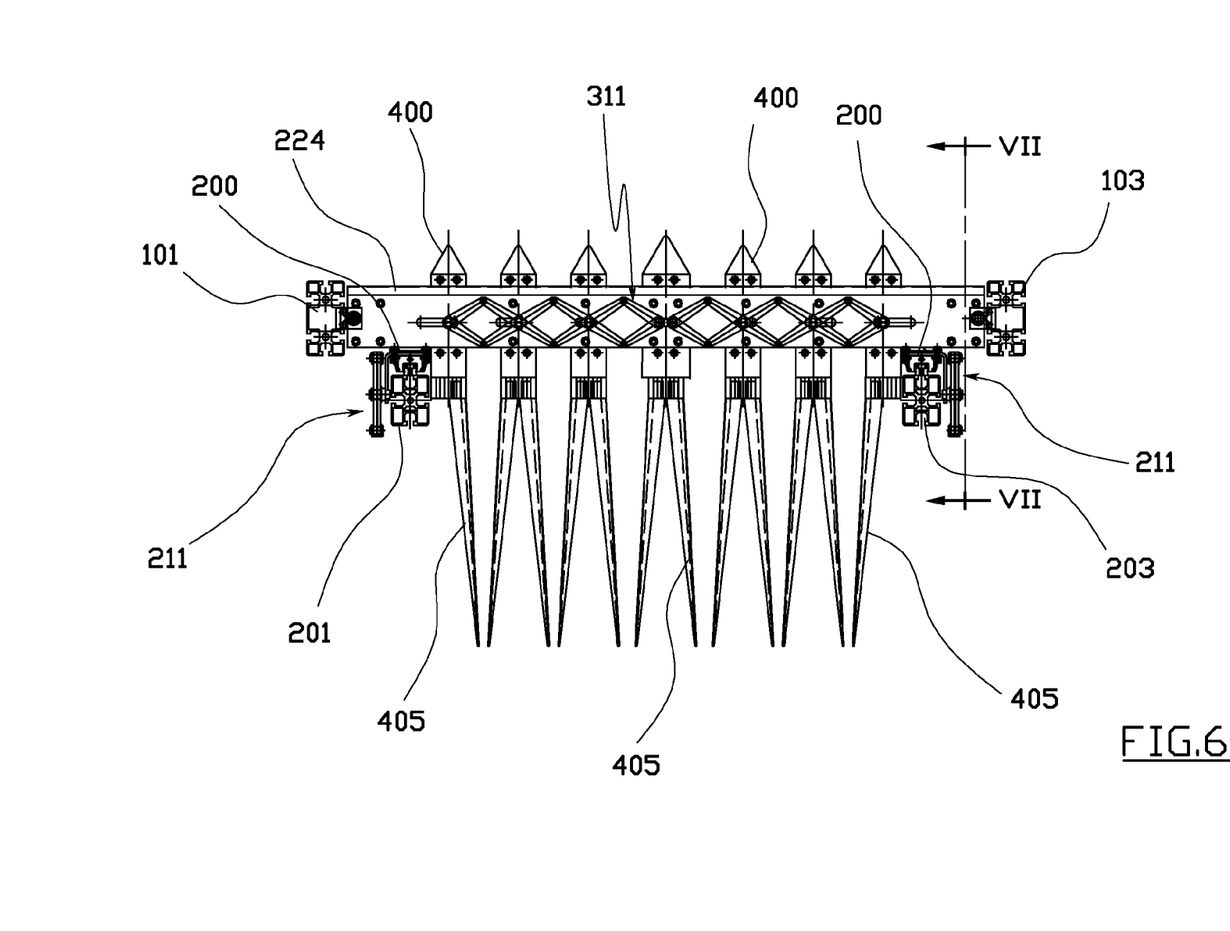
FIG. 6 shows the section VI-VI shown in FIG. 5.
Figure 7:
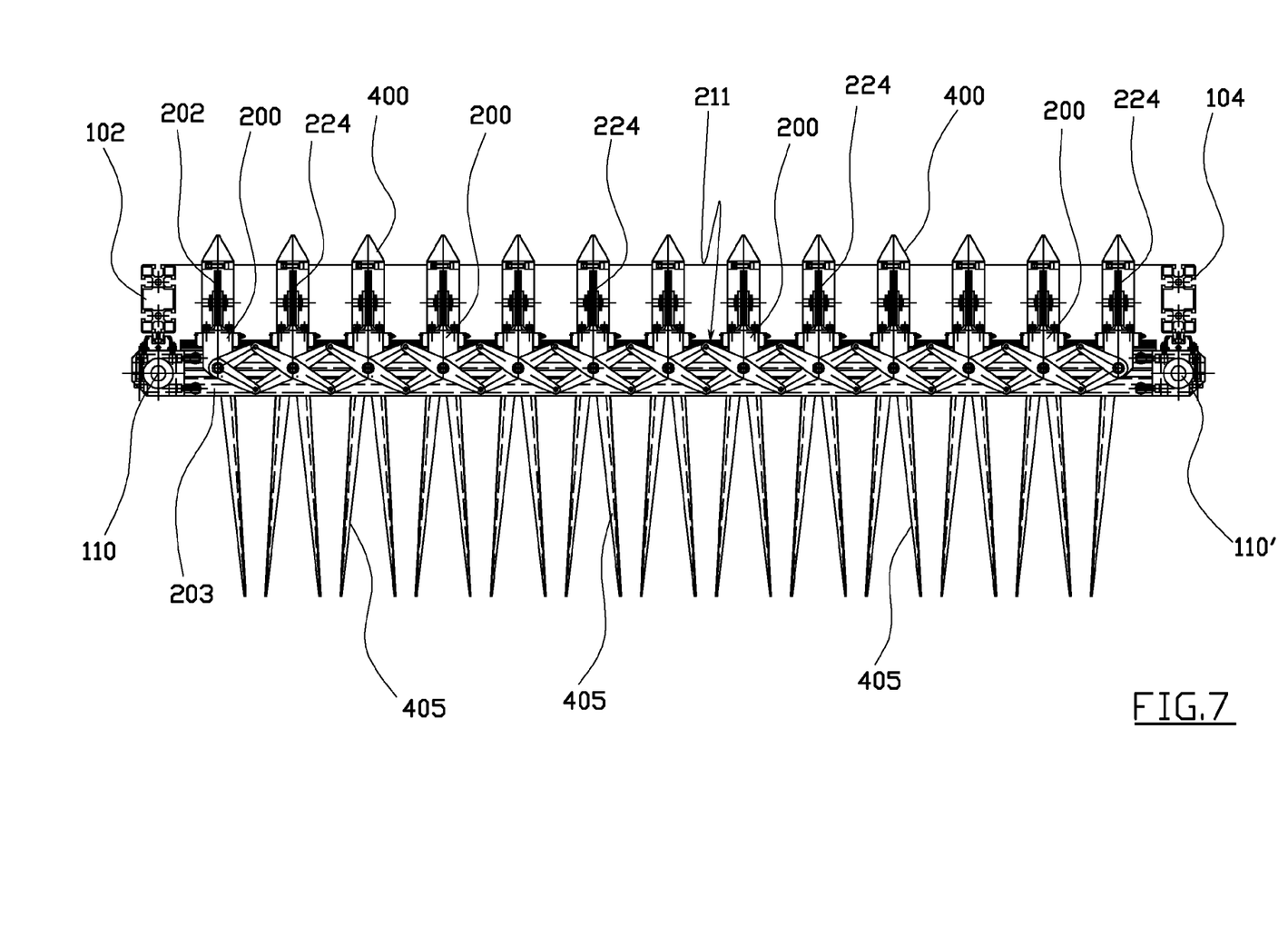
FIG. 7 shows the section VII-VII shown in FIG. 6.
Figure 8:
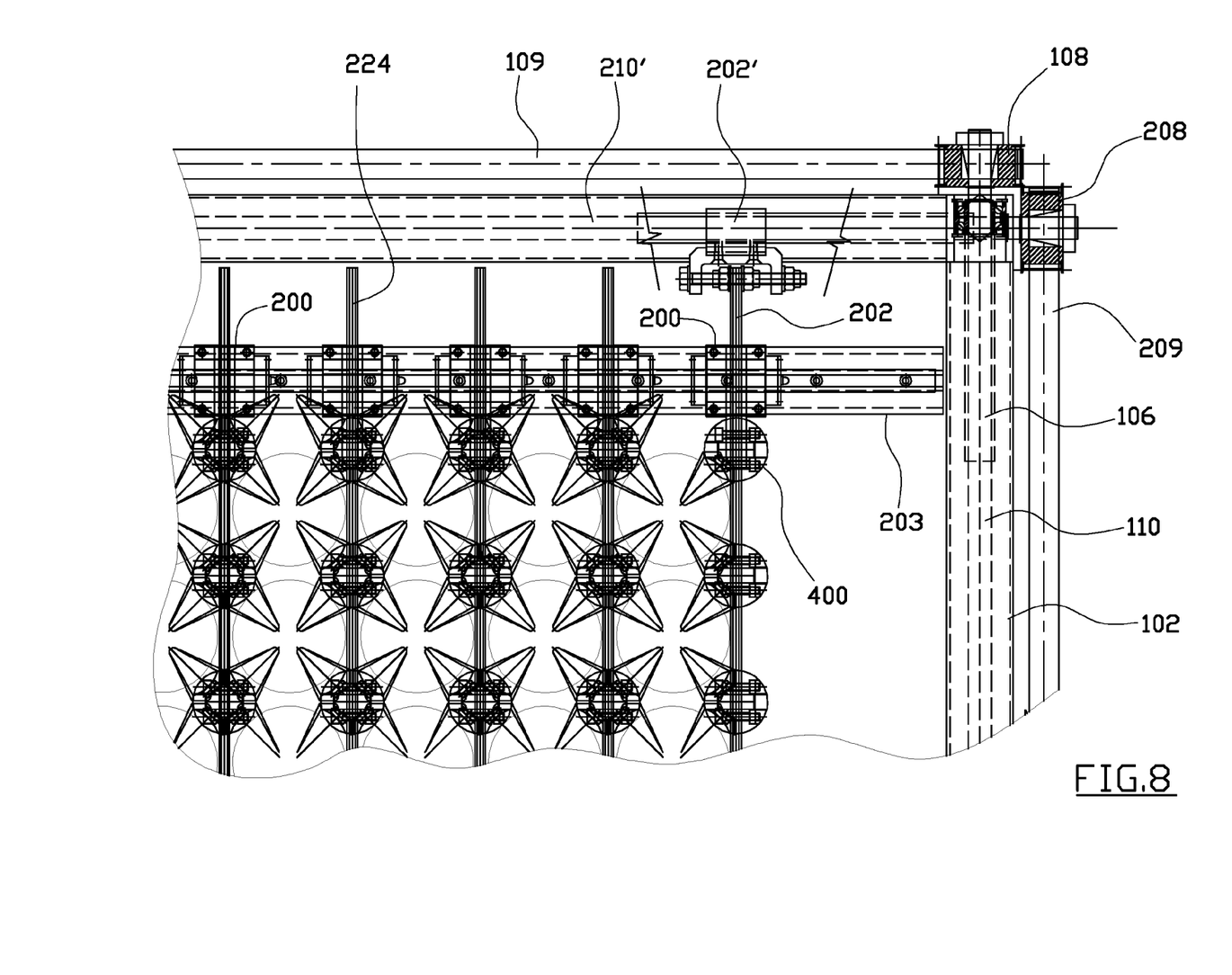
FIG. 8 shows an enlarged detail of FIG. 1.

As shown in FIGS. 2, 6, and 7, the blocks 200 arranged on a same cross member 201, 203 are reciprocally connected by a pantograph device 211, which ensures that in response to the movements of the guides 202, 294, the guides 224 remain reciprocally equidistant.

Seven centring members 400 slide on each of the guides 202, 224 and 204, the centring members 400 of each guide being connected to one another by a pantograph device 311 inserted within the relative guide 202, 204 and 224 (see FIG. 6).

In particular, each single guide 202, 204 and 224 consists of two reciprocally-facing shaped plates, at the interface whereof a gap is defined for receiving the relative pantograph device 311 (see FIG. 9); the pantograph device 311 being connected to the centring members 400 associated with the guide, by a series of pivots which project from respective holes and slots afforded by the facing plates.

The centring members 400 situated at the ends of each guide 202, 204 and 224, are further constrained respectively to one of the two blocks 200 which support the relative guide, by means of brackets (not illustrated).

In this way, each individual pantograph device 311 ensures that in response to the movements of the cross members 201 and 203, the centring members slide on the relative guides 202, 204 and 224, while remaining reciprocally equidistant.

Together, all the centring members 400 define a centring grid, the cells whereof are suited to guiding in a downwards motion a respective bottle; each of the cells is delimited by a group of four devices 400 adjacent to one other.

In particular, the centring members 400 define the nodes of this grid.

Figure 9:
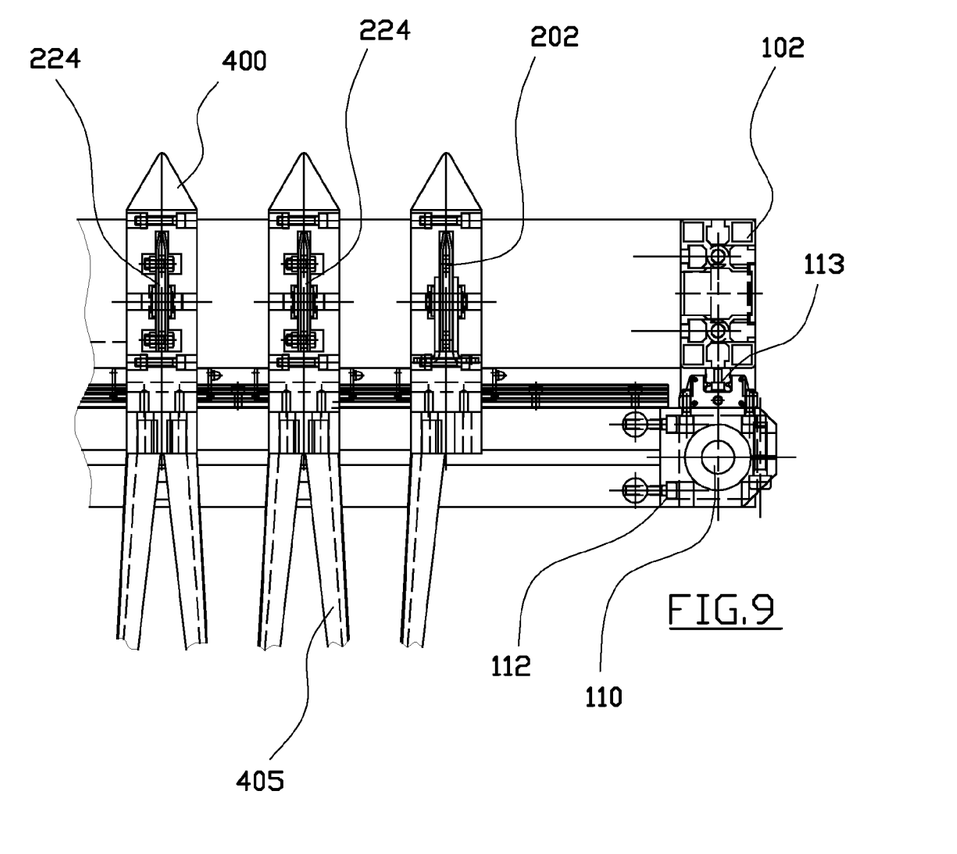
FIG. 9 shows an enlarged-scale detail of FIG. 5.
Figure 10:
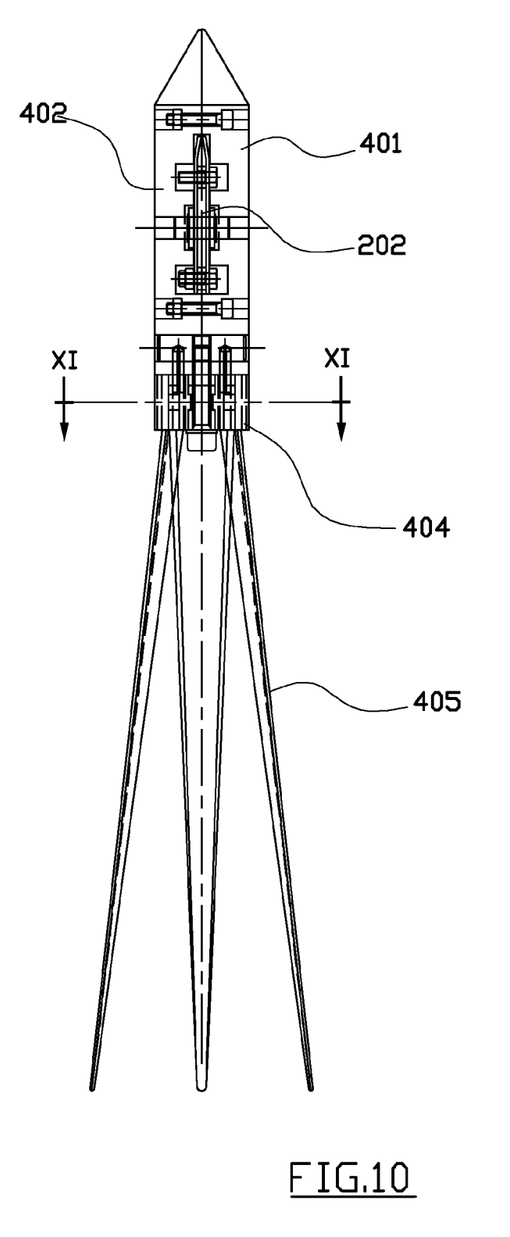
FIG. 10 shows a partially sectioned side view of a detail of the invention.
Figure 11:
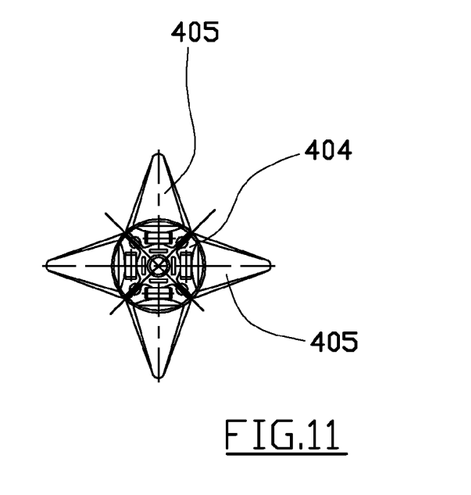
FIG. 11 shows the section XI-XI shown in FIG. 10.

The centring members 400 are better illustrated in figures from 9 to 11.

The devices each comprise an upper part composed of two halves 401 and 402 which, when assembled, afford the seating which receives the guide 202, 224, 204 on which the centring device is slidable.

The two shells inferiorly support four identical sectors 404, each bearing a suspended oscillating lead 405.

The sectors 404 are oriented at 45° relative to the guide on which the centring device 400 is slidingly inserted, in such a way that the leads 405 can oscillate in the planes that include the diagonals of the respective cells of the centring grid.

In use, by activating the endless screw devices with which the frame 10 is provided, the cross members 201, 203 and the guides 202, 204, 224 are respectively brought reciprocally closer or further away, so as to arrange the centring members 400 in a position in which they define a centring grid having a same configuration as the cardboard insert in the carton to be filled. Then the frame 10 is lowered vertically onto the carton, until the oscillating leads 405 belonging to each cell of the centring grid penetrate into a relative cell of the insert.

Finally the bottles, lowered from above, spread the oscillating leads 405 which guide each bottle into the relative cell of the insert, thus preventing the bottles from catching against the upper edge of the latter.

The invention claimed is:

1. A device for centering objects, comprising a supporting frame which supports flat grid, the individual cells of which are each suitable for downwardly guiding an object to be centered, the device comprising a plurality of parallel rows of distinct centering members which define nodes of the flat grid, each single row of the centering members being associated to a single straight guide of a series of coplanar, parallel straight guides, wherein the straight guides are mobile on the supporting frame, and are connected to one another by a mechanism activated by moving means which is configured such as to allow a reciprocal nearing and distancing of the straight guides while remaining equidistant to one another, and wherein the centering members of each row are slidingly coupled to the relative straight guide and are reciprocally connected to each other by an individual mechanism configured in such a way as to allow each centering member of said row to slide along the relative straight guide, thereby nearing and distancing reciprocally while remaining equidistant to one another, moving means provided for moving all the individual mechanisms.

2. The device of claim 1, characterised in that each mechanism associated to a row of centering members comprises at least a pantograph device which connects the centering devices.

3. The device of claim 2, characterised in that the pantograph device is inserted within the guide with which the relative centering devices are associated.

4. The device of claim 2, characterised in that the first means for moving the mechanisms associated with each row of centering members comprise: at least a cross member, arranged orthogonally to the guides and slidable on the supporting frame in a parallel direction to the guides, a set of blocks, longitudinally slidable on the cross member, each of which blocks is associated to a respective guide and is solidly constrained to a centering device of the guide, and means for moving for imparting movement to the cross member on the support frame.

5. The device of claim 4, characterised in that the first means for activating comprise two separate cross members the respective blocks of which are fixed to respective different centering members of the guides, and in that the means for moving cause the cross members to slide on the support frame in opposite directions.

6. The device of claim 5, characterised in that the means for moving cause the cross members to slide symmetrically in relation to a central axis of the support frame.

7. The device of claim 5, characterised in that the blocks of the cross members associated to the guide are respectively constrained to the centering members situated at the ends of the relative row of centring devices.

8. The device of claim 5, characterised in that the means for moving comprise at least one shaft, arranged perpendicular to the cross members and rotatably coupled to the support frame, which at least one shaft exhibits two portions of endless screw each of which is coupled to a respective block, which block is constrained to a respective cross member.

9. The device of claim 8, characterised in that the means for moving comprise two of the shafts, which are rotated by a motor via a motion transmission system connecting the at least two of the shafts to one other.

10. The device of claim 9, characterised in that the transmission system is a belt system.

11. The device of claim 1, characterised in that the mechanism associated with the guides comprises at least one pantograph device connecting the guides.

12. The device of claim 11, characterised in that the pantograph device connects the blocks, which blocks are slidable on the at least one cross member.

13. The device of claim 11, characterised in that the mechanism associated to the guides comprises two of the pantograph devices.

14. The device of claim 11, characterised in that the second means for moving for activating the mechanism associated with the straight guides comprise: at least one connecting group, slidable on the support frame in a perpendicular direction to the guides, which connects at least one of the guides to the support frame, and means for moving, for activating the connecting group on the support frame.

15. The device of claim 14, characterised in that the second means for moving comprise two distinct connecting groups which connect two separate guides to the support frame, and that the means for moving cause the connecting groups to slide on the support frame in opposite directions.

16. The device of claim 15, characterised in that the means for moving cause the connecting groups to slide symmetrically relative to a central axis of the support frame.

17. The device of claim 15, characterised in that the connecting groups are associated to the guides located at the ends of the series of guides.

18. The device according to claim 15, characterised in that the means for moving comprise at least one rotatable shaft, arranged perpendicular to the guides and rotatably coupled to the support frame, which at least one rotatable shaft has two portions of endless screw, to each of which a respective block belonging to the connecting groups is coupled.

19. The device of claim 18, characterised in that each connecting group comprises two of the blocks each of which is constrained to a relative guide of the guides, and that the means for moving comprise two of the rotatable shafts, which are rotated by the motor via a motion transmission system which connects the rotatable shafts to each other.

20. The device of claim 19, characterised in that the transmission system is a belt system.

21. Device of claim 1, characterised in that the centering members comprise at least one lead which extends transversally in relation to the grid plane and towards the centre of a cell which is adjacent thereto.

22. The device of claim 21, characterised in that the lead is flexible.

23. A device for centering objects, comprising
   a supporting frame which supports a flat grid, the individual cells of which are each suitable for downwardly guiding an object to be centered,
   the device comprising a plurality of parallel rows of distinct centering members which define nodes of the flat grid,
   each single row of the centering members being associated to a single straight guide of a series of coplanar, parallel straight guides,
   the straight guides being mobile on the supporting frame, and being connected to one another by a movable mechanism which is configured such as to allow a reciprocal nearing and distancing of the straight guides while remaining equidistant to one another,
   the centering members of each row being slidingly coupled to the relative straight guide and being reciprocally connected to each other by an individual mechanism configured in such a way as to allow each centering member of each row to near and to distance reciprocally while remaining equidistant to one another, a movable mechanism moving all the individual mechanisms.

24. A device for centering objects, comprising:
   a supporting frame which supports a flat grid, the individual cells of which are each suitable for downwardly guiding an object to be centered,
   a series of coplanar, parallel straight guides, which are mobile on the supporting frame and which are connected to one another by a movable mechanism configured such as to allow a reciprocal nearing and distancing of the straight guides while remaining equidistant to one another, and
   a plurality of parallel rows of distinct centering members which define nodes of the flat grid,
   wherein the centering members of each single row are slidingly coupled to one of said straight guides of the series, and wherein the centering members of each single row are reciprocally connected to each other by an individual mechanism configured in such a way as to allow each centering member of the row to near and to distance reciprocally while remaining equidistant to one another,
   a movable mechanism moving all the individual mechanisms.

* * * * *